June 23, 1964 R. J. GOOD 3,138,139
BIRD CAGE MEANS
Filed Sept. 30, 1963

INVENTOR.
RAYMOND J. GOOD
BY Ely, Pearne & Gordon
ATTORNEYS

United States Patent Office 3,138,139
Patented June 23, 1964

3,138,139
BIRD CAGE MEANS
Raymond J. Good, 1504 Highland Ave., Lakewood, Ohio
Filed Sept. 30, 1963, Ser. No. 312,460
2 Claims. (Cl. 119—26)

This invention relates to bird cage accessory equipment and more particularly to a deck that attaches to a bird cage adjacent the door of the cage.

Owners of cage birds and particularly parakeet owners frequently open the door of the cage to permit the bird to fly about the house for exercise and for the amusement of the owner. Many birds, however, are unwilling to leave their caged environment since the cage represents security to the bird. While the cage door may be left open, the bird frequently will not leave the cage but will merely roost on the bottom sill of the open doorway.

In order to encourage birds to leave their cage, terraces or patios have been devised. These terraces are fastened to the cage adjacent the door so that the bird may leave the cage but will be close to the cage door if he should decide to enter his cage. These prior art devices, however, can be attached to the cage only when the cage door is completely open or completely closed and therefore the device must be removed and replaced each time the door is opened or closed. The removal of the terrace is undesirable since it may frighten the bird and since it is sometimes desirable to close the cage door immediately after the bird has entered the cage.

Terraces and patios according to the prior art are designed for use with a particular cage and cannot be used on substantially all of the different cages that are manufactured today. Many cages are provided with a draft guard that surrounds the bottom portion of the cage below the cage door opening. The presence of a draft guard on a cage usually prevents the convenient installation of a terrace on the cage.

It is a general object of this invention to provide a device that overcomes many of these prior art problems.

It is a more specific object of this invention to provide a terrace or patio that may be conveniently installed on cages and that will permit the cage door to be opened and closed while the terrace is attached to the cage.

It is a further object of this invention to provide a terrace or patio having a novel attaching means that will secure the terrace to a bird cage whether or not the bird cage is provided with a draft guard.

A still further object of this invention is to provide a terrace for a bird cage that may be easily removed from the cage for cleaning or replacement.

These and other objects and advantages of the invention will become apparent from the following description and accompanying drawings.

Figure 1:
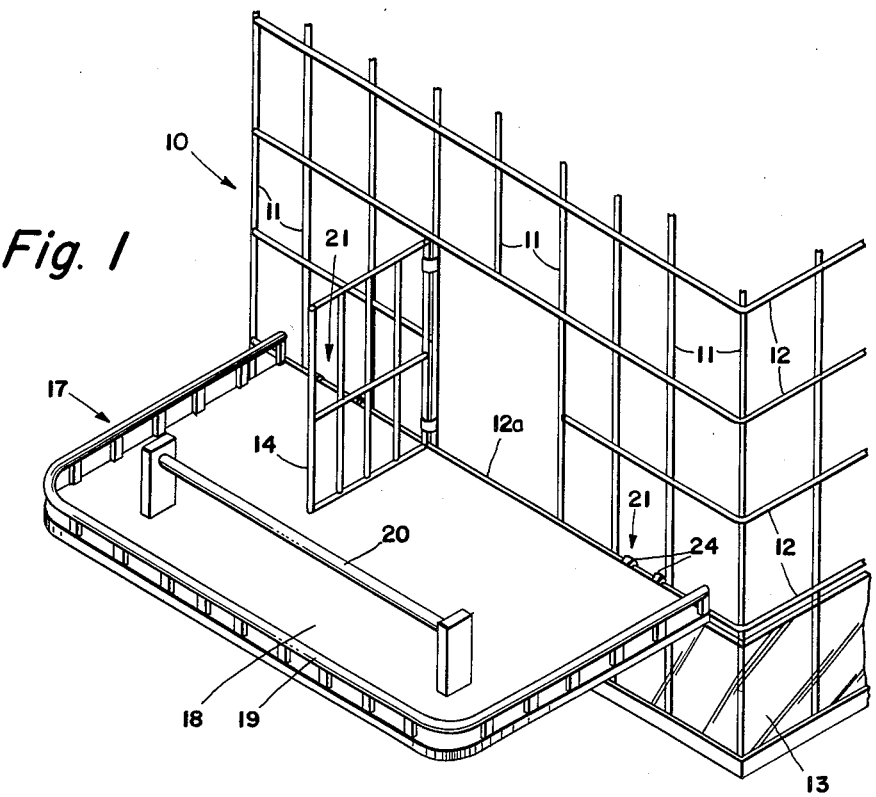
FIGURE 1 is a perspective view of a portion of a bird cage showing the terrace attached to the cage.
Figure 2:
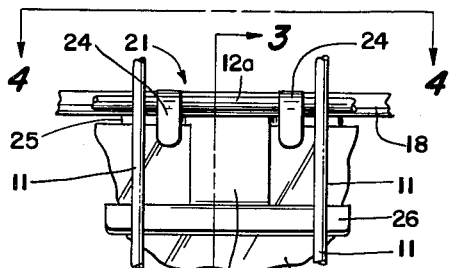
FIGURE 2 is a fragmentary elevational view of an attaching means according to this invention, looking at the attaching means from the interior of the cage.
Figure 4:
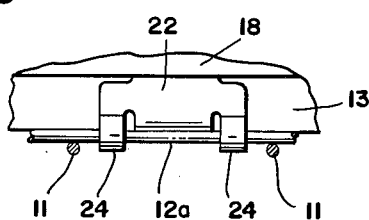
FIGURE 4 is a fragmentary view of an attaching means, the plane of the view being indicated by the line 4—4 in FIGURE 2.

Referring now to the drawings, a bird cage 10 is illustrated. The cage 10 comprises vertical and horizontal cage wire strands, 11 and 12 respectively, and includes a draft guard 13 and a cage door 14. As may be seen in FIGURE 3, the draft guard 13 is spaced from the vertical strands 11 a distance corresponding to the diameter of the horizontal strands 12 and nests in a trough 15 formed by the cage bottom 16.

A bird patio or terrace 17 is detachably mounted on the bird cage 10. The terrace 17 includes a horizontal shelf portion 18 and may include a rail 19 around three sides of the shelf portion 18. A perch 20 may also be provided on the shelf portion.

The terrace 17 is affixed to the cage 10 by a pair of attaching means 21 each of which includes a horizontally extending portion 22, a downwardly bent portion 23, and hook portions 24. The horizontal portion 22 of the attaching means 21 is fixed to the shelf portion. In the illustrated embodiment, each horizontal portion 22 is received in depending blocks 25 which are provided on the bottom of the shelf portion 18.

The terrace 17 is affixed to the cage 10 by inserting the vertical portion 23 of the attaching means 21 between the draft guard 13 and a horizontal wire strand 12a and pushing the terrace 17 downwardly until the hook portions 24 grip the strand 12a. The top of the draft guard 13 is gripped between the block 25 and the vertical portion 23 of the attaching means 21 and this gripping relationship helps to support the terrace 17 in a horizontal position.

It is to be understood that, although the draft guard 13 serves to support the terrace 17 in the illustrated embodiment, the attaching means 21 may support the terrace 17 on a cage that is not provided with a draft guard. To this end, the downwardly bent portions 23 are provided with lateral extensions 26 at their lower ends. The extensions 26 are bent inwardly so that they butt against the vertical wire strands 11, as may be seen most clearly in FIGURE 3. The horizontal length of the extensions 26 is slightly greater than the distance between adjacent vertical wire strands 11 so that the extension 26 will butt against at least one strand 11.

Figure 3:
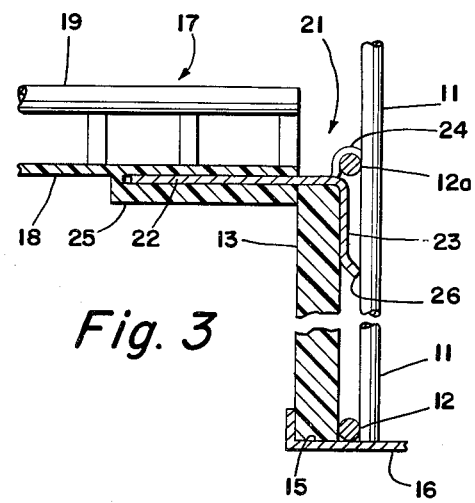
FIGURE 3 is a fragmentary cross sectional view of an attaching means, the plane of the section being indicated by the line 3—3 in FIGURE 2.

As may be seen in FIGURES 1 and 3, the attaching means 21 fixes the shelf portion 18 of the terrace 17 to the cage 10 at a level below the top of the strand 12a and, therefore, below the cage door 14. Thus the door 14 may be opened and closed without removing the terrace 17.

The invention is not limited to the form shown in the illustrated embodiment. Obviously, many further modifications and variations of the invention will become apparent to those skilled in the art in the light of the above teachings. Therefore, it is to be understood that, within the spirit and scope of the appended claims, the invention may be practiced otherwise than as specifically shown and described.

What is claimed is:

1. In a bird cage having vertical and horizontal cage wire strands, said strands defining a cage door opening immediately above one of said horizontal strands, a cage door for said cage door opening, a terrace including a shelf portion and attaching means fixed to said shelf portion, said attaching means including a substantially horizontal portion fixed to said shelf portion, a downwardly bent portion butting against at least one of said vertical strands and a hook portion gripping said one of said horizontal strands at a location that is spaced from said cage door opening and supporting said shelf portion at a level below said cage door opening, whereby said cage door may be opened and closed without removing the attaching means.

2. In a bird cage having vertical and horizontal cage wire strands, said strands defining a cage door opening immediately above one of said horizontal strands, and a draft guard having an upper edge below said door opening, a terrace including a shelf portion and attaching means fixed to said shelf portion, said attaching means including a substantially horizontal portion fixed to the bottom of said shelf portion by a block, and including a downwardly bent portion butting against at least one of said vertical strands, and further including a hook portion gripping said one of said horizontal strands, the upper edge of said draft guard being gripped between said block and said downwardly bent portion.

References Cited in the file of this patent

UNITED STATES PATENTS

| | | |
|---|---|---|
| 1,686,242 | Markow | Oct. 2, 1928 |
| 2,624,310 | Smithson | Jan. 6, 1953 |
| 2,690,159 | Sherry | Sept. 28, 1954 |
| 2,718,874 | Dunn | Sept. 27, 1955 |
| 2,720,860 | Jenkinson | Oct. 18, 1955 |